United States Patent
Park et al.

(10) Patent No.: US 8,775,870 B2
(45) Date of Patent: Jul. 8, 2014

(54) METHOD AND APPARATUS FOR RECOVERING ERRORS IN A STORAGE SYSTEM

(75) Inventors: Chang-Sik Park, Seoul (KR); Mi-Jeom Kim, Gyeonggi-do (KR); Hyo-Min Kim, Seoul (KR); Eo-Hyung Lee, Gyeonggi-do (KR); Jin-Kyung Hwang, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 213 days.

(21) Appl. No.: 13/334,710

(22) Filed: Dec. 22, 2011

(65) Prior Publication Data

US 2012/0166870 A1    Jun. 28, 2012

(30) Foreign Application Priority Data

Dec. 22, 2010    (KR) .................. 10-2010-0132416

(51) Int. Cl.
    *G06F 11/00*    (2006.01)
(52) U.S. Cl.
    USPC ........................................... 714/15
(58) Field of Classification Search
    USPC ............ 714/6.1, 6.24, 6.3, 13, 15, 21, 52, 54, 714/800, 803, 805, 799, 819; 707/690, 691, 707/697–699
    See application file for complete search history.

(56) References Cited

U.S. PATENT DOCUMENTS

| | | | |
|---|---|---|---|
| 4,714,992 A | 12/1987 | Gladney et al. | |
| 5,200,963 A * | 4/1993 | Chau et al. | 714/820 |
| 5,315,601 A | 5/1994 | Lee et al. | |
| 5,757,783 A | 5/1998 | Eng et al. | |
| 5,907,671 A * | 5/1999 | Chen et al. | 714/6.24 |
| 5,909,540 A | 6/1999 | Carter et al. | |
| 6,192,365 B1 | 2/2001 | Draper et al. | |
| 6,785,838 B2 * | 8/2004 | Lim et al. | 714/6.12 |
| 7,650,328 B2 | 1/2010 | Hori et al. | |
| 7,701,925 B1 | 4/2010 | Mason et al. | |
| 7,739,233 B1 | 6/2010 | Ghemawat et al. | |
| 7,823,009 B1 | 10/2010 | Tormasov et al. | |
| 7,853,770 B2 | 12/2010 | Tajima et al. | |
| 8,103,636 B2 | 1/2012 | Lee et al. | |
| 2002/0055924 A1 | 5/2002 | Liming | |
| 2002/0065919 A1 | 5/2002 | Taylor et al. | |
| 2004/0064633 A1 | 4/2004 | Oota | |
| 2005/0125456 A1 | 6/2005 | Hara et al. | |

(Continued)

FOREIGN PATENT DOCUMENTS

JP    2008-059438 A    3/2008
KR    10-1993-0007928 B1    8/1993

(Continued)

*Primary Examiner* — Scott Baderman
*Assistant Examiner* — Joseph Kudirka
(74) *Attorney, Agent, or Firm* — IP Legal Services, LLC

(57) ABSTRACT

Apparatus and method for recovering errors from erroneous files in a storage system. In order to recover the errors from the erroneous files, each of at least three erroneous files stored in the storage system may be divided in half to form three sets of divided files. Three corresponding portions from each of the three sets of divided files may be compared. A determination may be made as to whether at least two portions among the three corresponding portions are substantially identical. Based on the determination, substantially identical portions are determined to be non-erroneous portions. Then, a non-matched portion that is not substantially identical to the two substantially identical portions may be replaced with one of the non-erroneous portions.

17 Claims, 5 Drawing Sheets

(56) References Cited

U.S. PATENT DOCUMENTS

| | | |
|---|---|---|
| 2005/0256923 A1 | 11/2005 | Adachi |
| 2005/0283487 A1 | 12/2005 | Karlsson et al. |
| 2006/0047751 A1 | 3/2006 | Chen et al. |
| 2006/0069828 A1 | 3/2006 | Goldsmith |
| 2006/0200488 A1 | 9/2006 | Chu-Carroll et al. |
| 2007/0300220 A1 | 12/2007 | Seliger et al. |
| 2008/0005199 A1 | 1/2008 | Chen et al. |
| 2008/0021935 A1 | 1/2008 | Geelen et al. |
| 2008/0059704 A1 | 3/2008 | Kavuri |
| 2008/0317068 A1 | 12/2008 | Sagar et al. |
| 2009/0089499 A1 | 4/2009 | Abe et al. |
| 2009/0144422 A1 | 6/2009 | Chatley et al. |
| 2009/0144579 A1 | 6/2009 | Swanson |
| 2009/0210742 A1* | 8/2009 | Adarshappanavar et al. .... 714/6 |
| 2009/0260005 A1 | 10/2009 | Nakagawa et al. |
| 2010/0058341 A1 | 3/2010 | Jung et al. |
| 2010/0076933 A1 | 3/2010 | Hamilton et al. |
| 2010/0161759 A1 | 6/2010 | Brand |
| 2010/0185537 A1 | 7/2010 | Bari |
| 2010/0262717 A1 | 10/2010 | Critchley et al. |
| 2010/0274762 A1 | 10/2010 | Murphy et al. |
| 2010/0274983 A1 | 10/2010 | Murphy et al. |
| 2010/0318609 A1 | 12/2010 | Lahiri et al. |
| 2010/0325199 A1 | 12/2010 | Park et al. |
| 2010/0332530 A1 | 12/2010 | McKelvie et al. |
| 2010/0333116 A1 | 12/2010 | Prahlad et al. |
| 2011/0202741 A1 | 8/2011 | Tajima et al. |
| 2012/0079499 A1 | 3/2012 | Gold et al. |

FOREIGN PATENT DOCUMENTS

| | | |
|---|---|---|
| KR | 10-2001-0091593 A | 10/2001 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0060304 A | 6/2010 |
| KR | 10-2010-0060715 A | 6/2010 |
| KR | 10-2010-0069234 A | 6/2010 |
| KR | 10-2010-0073154 A | 7/2010 |
| KR | 10-2010-0092850 A | 8/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |
| WO | WO 2010026366 A1 * | 3/2010 |

* cited by examiner

METHOD AND APPARATUS FOR RECOVERING ERRORS IN A STORAGE SYSTEM

CROSS REFERENCE TO PRIOR APPLICATIONS

The present application claims priority under 35 U.S.C. §119 to Korean Patent Application No. 10-2010-0132416 (filed on Dec. 22, 2010), which is hereby incorporated by reference in its entirety.

FIELD OF THE INVENTION

Apparatuses and methods consistent with the present invention relate to recovering errors in a storage system to obtain data consistency, and more particularly, to recovering errors from all erroneous files including an original file and its replicas stored in a storage system.

BACKGROUND OF THE INVENTION

When storing a file, a storage system may store an original file as well as a plurality of replicas of the original file in a single server or multiple distributed servers in case an error occurs. A storage system may regularly verify data consistency among an original file and its replicas. If a file is determined to be erroneous, the erroneous file may be recovered by replacing with a non-erroneous file.

However, it may be difficult for a storage systems to recover errors when errors occur in all corresponding files including an original file and all replicas using such a data consistency verification method.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with embodiments, errors may be recovered even when the errors occur in all corresponding files including an original file and all replicas stored in a storage system. In, accordance with embodiments, errors may be recovered from all erroneous files by repeatedly dividing the erroneous files in half until at least two of divided corresponding portions are matched each other. Accordingly, errors may be recovered in an efficient way, thus improving bandwidth of a system, costs of a system, and/or overall effectiveness/efficiency of a system, in accordance with embodiments.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1A:
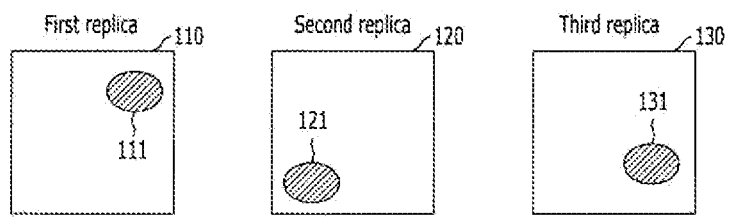
FIGS. 1A to 1D illustrate an example of a process of recovering errors from three erroneous files stored in a storage system, in accordance with embodiments.

In accordance with embodiments, a method may be provided for recovering errors from erroneous files in a storage system. In order to recover errors from erroneous files, each of at least three erroneous files stored in the storage system may be divided in half to form three sets of divided files. Three corresponding portions from each of the three sets of divided files may be compared. A determination may be made as to whether at least two portions among the three corresponding portions are substantially identical. Based on the determination, substantially identical portions may be determined to be non-erroneous portions. Then, a non-matched portion that is not substantially identical to the two substantially identical portions may be replaced with one of the non-erroneous portions to recover errors in the non-matched portion.

In accordance with embodiments, a method may be provided for recovering errors from erroneous files in a storage system. In order to recover errors from erroneous files, corresponding portions from each of the erroneous files may be compared. A determination may be made as to whether at least two corresponding portions among the corresponding portions are substantially identical. Based on the determination, substantially identical portions may be determined to be non-erroneous portions. Then, a non-matched portion that is not substantially identical to the two substantially identical portions may be replaced with one of the non-erroneous portions to recover errors in the non-matched portion.

In accordance with embodiments, an apparatus may be provided for recovering errors from erroneous files stored in a storage system. The apparatus may include a comparison unit, a determination unit, an error recovery unit, and a division unit. The comparison unit may be configured to compare corresponding portions from each of the erroneous files. The determination unit may be configured to determine whether at least two corresponding portions among the corresponding portions are substantially identical. Based on the determination, substantially identical portions may be determined to be non-erroneous portions. The error recovery unit may be configured to replace a non-matched portion that is not substantially identical to the two substantially identical portions with one of the non-erroneous portions to recover errors in the non-matched portion. The division unit may be configured to divide each of the corresponding portions into sub-portions.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with embodiments, errors may be recovered even when all of an original file and its replicas have errors. In order to recover errors from erroneous files, each of erroneous files may be divided in half. Then, corresponding portions each divided from the erroneous files may be compared. A determination may be made as to whether at least two portions among the corresponding portions are matched each other. As a result of the determination, the matched at least two portions, may be determined to be non-erroneous. A remaining non-matched portion may be replaced with a non-erroneous portion, therefore recovering errors in an erroneous file.

On the other hand, when at least two portions among the corresponding portions are not determined to be matched each other, the corresponding portions may be repeatedly divided in half until at least two of divided portions are determined to be matched each other. For example, in embodiments, the process of division and determination may be repeatedly performed until a size of a non-matched divided portion becomes 1 bit. Accordingly, errors may be recovered even when all of an original file and its replicas have errors, providing data consistency in a storage system.

FIGS. 1A to 1D illustrate an example of a process of recovering errors from erroneous files stored in a storage system, in accordance with embodiments. Referring to FIG. 1A, the first replica 110, the second replica 120, and the third replica 130 may have errors as marked with black regions 111, 121, and 131, respectively. Although, for convenience and ease of understanding, the three erroneous replicas 110, 120, and 130 are used to describe any or all of erroneous files, the erroneous files may include an original file and the number of the erroneous files may be more than three.

In accordance with embodiments, assuming that a master parity is stored in a storage system, all of corresponding files including an original file and its replicas may be determined to be erroneous files when no parities of the corresponding files are matched with the master parity. On the other hand, if a storage system does not have a master parity, each parities of the corresponding files may be compared each other. When at least two parities among the parities of the corresponding files are not matched each other, all of the corresponding files are determined to be erroneous files.

Figure 1B:
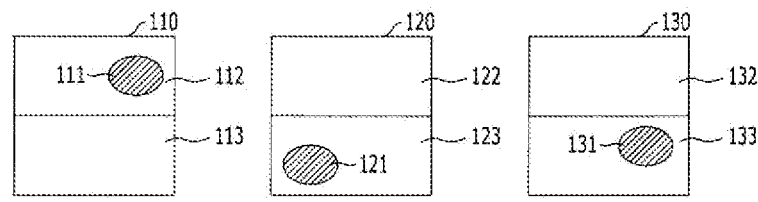

As illustrated in FIG. 1B, each of the first, second, and third erroneous replicas 110, 120, and 130 may be divided in half. Each of the first, second, and third erroneous replicas 110, 120, and 130 has first, second, and third upper halves 112, 122, and 132 and first, second, and third lower halves 113, 123, and 133, respectively. Then, the first, second, and third upper halves 112, 122, and 132 each from the first, second, and third replicas 110, 120, and 130 may be compared each other in order to verify data consistency. For example, the parity of each the first, second, and third upper halves 112, 122, and 132 may be calculated and compared each other.

For example, as illustrated in FIG. 1B, while the first upper half 112 of the first replica 110 may have errors denoted as 111, the second and third upper halves 122 and 132 of the second and third replicas 120 and 130 may have no errors. Therefore, the parities of the second and third upper halves 122 and 132 may be matched to each other while the parity of the first upper half 112 may not be matched with the two parities of the second and third upper halves 122 and 132. As a result of the comparison, the second and third upper halves 122 and 132 of the second and third replicas 120 and 130 may be determined to be non-erroneous while the first upper half 112 of the first replica 110 may be determined to be erroneous. Then, the first upper half 112 of the first replica 110 may be replaced with one of the non-erroneous upper halves 122 and 132 of the second and third replicas 120 and 130, therefore recovering the errors 111 in the first replica 110.

Next, the first, second, and third lower halves 113, 123, and 133 each from the first, second, and third replicas 110, 120, and 130 may be compared each other in order to verify data consistency. For example, the parity of each the first, second, and third lower halves 113, 123, and 133 may be computed and compared each other. For example, as illustrated in FIG. 1B, while the first lower half 113 of the first replica 110 may have no errors, the second and third lower halves 123 and 133 of the second and third replicas 120 and 130 may have errors denoted as 121 and 131 respectively.

Therefore, no parities of the three lower halves 113, 123, and 133 of the first, second, and third replicas 110, 120, and 130 may be matched to each other since the errors 121 and 131 in the second and third lower halves 123 and 133 are located in different portions of the respective replicas 120 and 130. As a result of the comparison, each of the first, second, and third lower halves 113, 123, and 133 of the first, second, and third replicas 110, 120, and 130 may be divided in half.

Figure 1C:
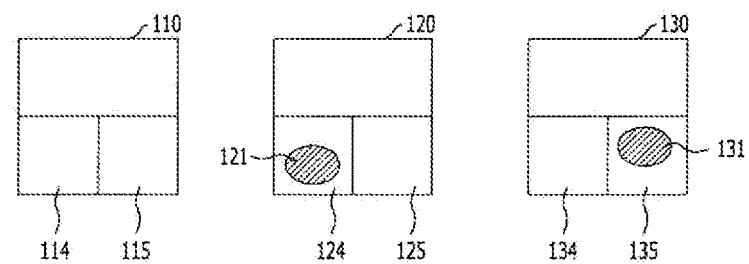

Then, as illustrated in FIG. 1C, each of the lower halves 113, 123, and 133 has the first, second, and third left halves 114, 124, and 134 and the first, second, third right halves 115, 125, and 135, respectively. Then, the first, second, and third left halves 114, 124, and 134 each from the first, second, and third replicas 110, 120, and 130 may be compared each other in order to verify data consistency. For example, the parity of each the first, second, and third left halves 114, 124, and 134 may be calculated and compared each other. For example, as illustrated in FIG. 1C, while the second left half 124 of the second replica 120 may have errors denoted as 121, the first and third left halves 114 and 134 of the first and third replicas 110 and 130 may have no errors.

Therefore, the two parities of the first and third left halves 114 and 134 may be matched to each other while the parity of the second left half 124 may not be matched with the two parities of the first and third left halves 114 and 134. As a result of the comparison, the first and third left halves 114 and 134 of the first and third replicas 110 and 130 may be determined to be non-erroneous while the second left half 124 of the second replica 120 to be erroneous.

Then, the second left half 124 of the second replica 120 may be replaced with one of the non-erroneous left halves 114 and 134 of the first and third replicas 110 and 130, therefore recovering the errors 121 in the second replica 120. Next, the first, second, and third right halves 115, 125, and 135 each from the first, second, and third replicas 110, 120, and 130 may be compared each other in order to verify data consistency. For example, the parity of each the first, second, and third right halves 115, 125, and 135 may be computed and compared each other.

For example, as illustrated in FIG. 1C, while the first and second right halves 115 and 125 of the first and second replicas 110 and 120 may have no errors, the third right half 135 of the third replica 130 may have errors denoted as 131. Therefore, the two parities of the first and second right halves 115 and 125 may be matched each other while the parity of the third right half 135 may not be matched with the two parities of the first and second right halves 115 and 125.

Figure 1D:
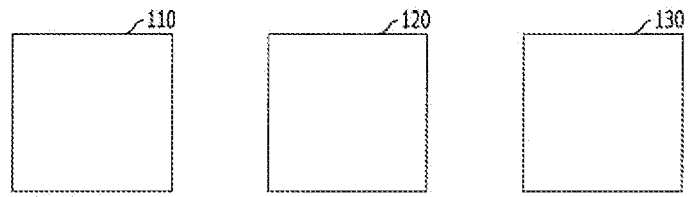

As a result of the comparison, the first and second right halves 115 and 125 of the first and second replicas 110 and 120 may be determined to be non-erroneous while the third right half 125 of the third replica 130 to be erroneous. Then, the third right half 135 of the third replica 130 may be replaced with one of the non-erroneous right halves 115 and 125 of the first and second replicas 110 and 120, therefore recovering the errors 131 in the third replica 130. Accordingly, as illustrated in FIG. 1D, all errors in the three erroneous replicas 110, 120, and 130 may be recovered by performing the error recovery process illustrated in FIGS. 1A through 1C.

In accordance with embodiments, after all errors are recovered from erroneous files, corresponding divided portions may be combined to form recovered files. Then, each parity of each of the recovered files may be computed and compared with a master parity stored in a storage system to make sure that the error recovery is successful. When at least one parity among the parities of the recovered files is matched with the master parity, the error recovery may be determined to be successful. On the other hand, if a storage system does not store a master parity, each parities of the recovered files may be compared to each other. When at least two parities among the parities of the recovered files are matched to each other, the error recovery may be determined to be successful.

Figure 2:
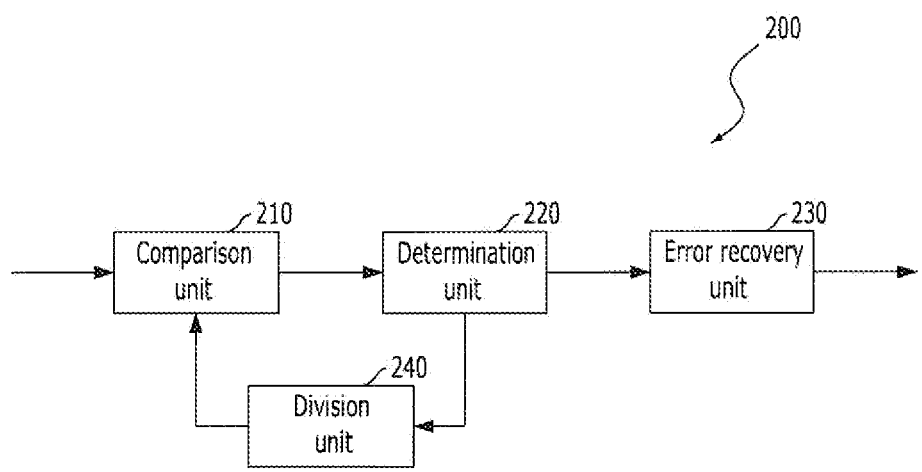
FIG. 2 illustrates an apparatus for recovering errors from erroneous files in a storage system, in accordance with embodiments.

FIG. 2 illustrates an apparatus for recovering errors from erroneous files in a storage system, in accordance with embodiments. Referring to FIG. 2, the apparatus 200 may include a comparison unit 210, a determination unit 220, an error recovery unit 230, and a division unit 240.

The comparison unit 210 may compare parities of corresponding files including an original file and its replicas with a master parity stored in a storage system to verify data consistency among the original file and its replicas. When no parity of the corresponding files is matched with the master parity, all of the corresponding files may be determined to be erroneous files. The comparison unit 210 may compare parities of the corresponding files with each other when a storage system does not store a master parity. When at least two parities are not matched each other, all of the corresponding files may be determined to be erroneous files. The erroneous files may be divided in half.

The comparison unit 210 may compare the corresponding portions each divided from the erroneous files to verify data consistency among the divided corresponding portions. When at least two corresponding portions are matched each other, the at least two corresponding portions may be determined to be non-erroneous portions. Then, erroneous portions may be replaced with one of the non-erroneous portions to recover errors in the erroneous portions. On the other hand, when at least two corresponding portions are not matched each other, each of the corresponding portions may be divided in half again.

The comparison unit 210 may compare the divided corresponding sub-portions to verify data consistency among the divided corresponding sub-portions. When at least two corresponding sub-portions are matched each other, the at least two corresponding sub-portions are determined as non-erroneous. Then, erroneous sub-portions may be replaced with one of the non-erroneous sub-portions to recover errors in the erroneous sub-portions. On the other hand, when at least two corresponding sub-portions are not matched each other, each of the corresponding sub-portions may be divided in half again. Such division and comparison may be repeatedly performed until a size of a divided portions becomes 1 bit.

The determination unit 220 may determine corresponding files including an original file and all its replicas to be erroneous files when no parities of the corresponding files are matched with the master parity. In case of no master parity in a storage system, the determination unit 220 may determine corresponding files including an original file and all its replicas to be erroneous files when at least two parities among the parities of the corresponding files are not matched each other. The erroneous files may be divided in half.

The determination unit 220 may determine at least two divided corresponding portions to be non-erroneous when the at least two divided corresponding portions are matched each other. Then, erroneous portions may be replaced with one of the non-erroneous portions to recover errors in the erroneous portions. On the other hand, when at least two corresponding portions are not matched each other, each of the corresponding portions may be divided in half again.

The determination unit 220 may determine at least two divided corresponding sub-portions to be non-erroneous when the at least two divided corresponding sub-portions are matched to each other. Then, erroneous sub-portions may be replaced with one of the non-erroneous sub-portions to recover errors in the erroneous sub-portions. On the other hand, when at least two corresponding sub-portions are not matched each other, each of the corresponding sub-portions may be divided in half again. Such division and comparison may be repeatedly performed until the size of the divided portions becomes 1 bit.

The division unit 240 may divide each erroneous file in half in order to recover errors in the erroneous files when corresponding files including an original file and all its replicas are determined to be erroneous files. When at least two divided corresponding portions are matched each other, the at least two divided corresponding portions may be determined to be non-erroneous portions. Then, erroneous portions may be replaced with one of the non-erroneous portions to recover errors in the erroneous portions.

The division unit 240 may divide each of the corresponding portions in half again when at least two corresponding portions are not matched each other. When at least two divided corresponding sub-portions are matched to each other, the at least two divided corresponding sub-portions may be determined to be non-erroneous. Then, erroneous sub-portions may be replaced with one of the non-erroneous sub-portions to recover errors in the erroneous sub-portions.

The division unit 240 may divide each of the corresponding sub-portions in half again when at least two corresponding sub-portions are not matched each other. Such a division may be repeatedly performed until a size of a divided portion becomes 1 bit. The error recovery unit 230 may replace erroneous portions with one of non-erroneous corresponding portions to recover errors in the erroneous portions. Accordingly, errors may be recovered even when all of an original file and its replicas have errors, providing data consistency in a storage system.

Figure 3:
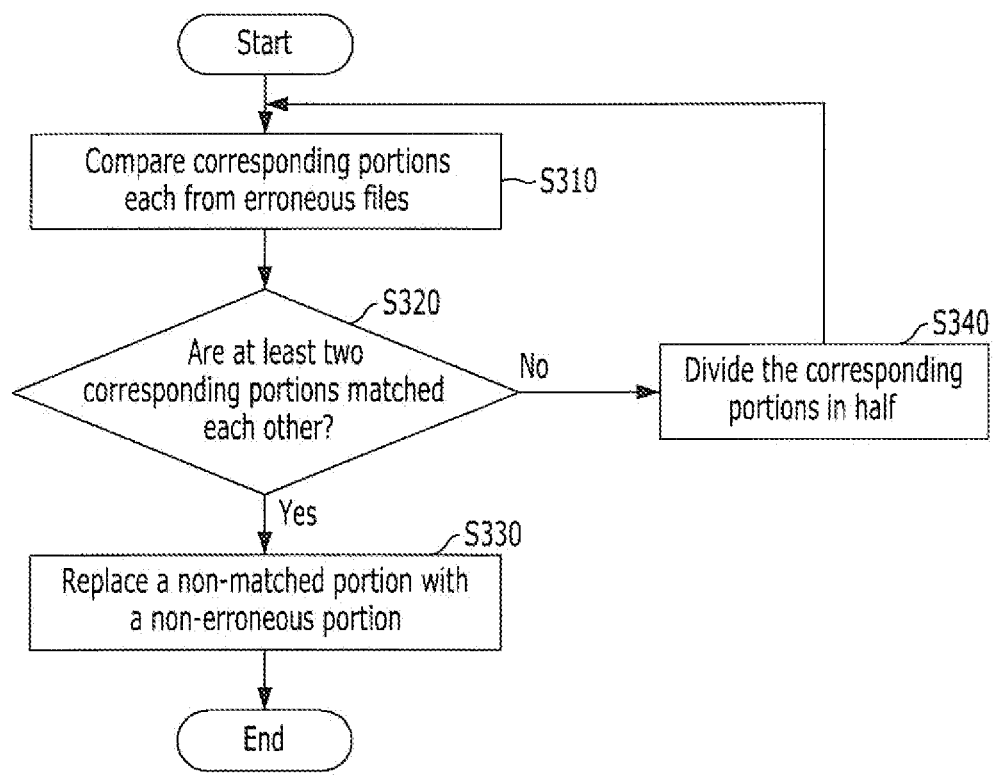
FIG. 3 illustrate a method for recovering errors from erroneous files in a storage system, in accordance with embodiments.

FIG. 3 illustrates a method for recovering errors from erroneous files in a storage system, in accordance with embodiments. Referring to FIG. 3, corresponding portions each from erroneous files stored in a storage system may be compared each other S310. For example, a comparison unit 210 may compare the corresponding portions each divided from the erroneous files to verify data consistency among the divided corresponding portions.

Then, a determination may be made as to whether at least two corresponding portions are matched each other S320. When at least two corresponding portions are not matched each other (S320-NO), each of the corresponding portions may be divided in half S340. For example, a division unit 240 may divide each of the corresponding portions in half when at least two corresponding portions are not matched each other. Such a division may be repeatedly performed until at least two divided corresponding portions are matched each other.

On the other hand, when the at least two corresponding portions are matched to each other (S320-YES), a determination unit 220 may determine the at least two corresponding portions as non-erroneous portions. Then, erroneous portions which are not matched with the non-erroneous portions may be replaced with one of the non-erroneous corresponding portions to recover errors in the erroneous portions S330. For example, an error recovery unit 230 may recover the errors in the erroneous files by replacing erroneous portions with one of the corresponding portions which are determined as non-erroneous. Accordingly, errors may be recovered even when all of an original file and its replicas have errors, providing data consistency in a storage system.

In accordance with embodiments, prior to comparing the corresponding portions each from the erroneous files, each parity of corresponding files may be compared with a master parity stored in a storage system. Then, all of the corresponding files may be determined to be erroneous files when no parity of the corresponding files is matched with the master parity. On the other hand, if a storage system does not have a master parity, each parities of the corresponding files may be compared each other. When at least two parities among the parities of the corresponding files are not matched to each other, all of the corresponding files are determined to be erroneous files.

In accordance with embodiments, after all errors are recovered from erroneous files, respective two divided portions may be combined to form recovered files. Then, each parity of the recovered files may be computed and compared with a mater parity stored in a storage to make sure that the error recovery is successful. When at least one parity among the parities of the recovered files is matched with the master parity, the error recovery may be determined to be successful. On the other hand, if a storage system does not store a master parity, each parities of the recovered files may be compared each other. When at least two parities among the parities of the recovered files are matched each other, the error recovery may be determined to be successful.

Figure 4:
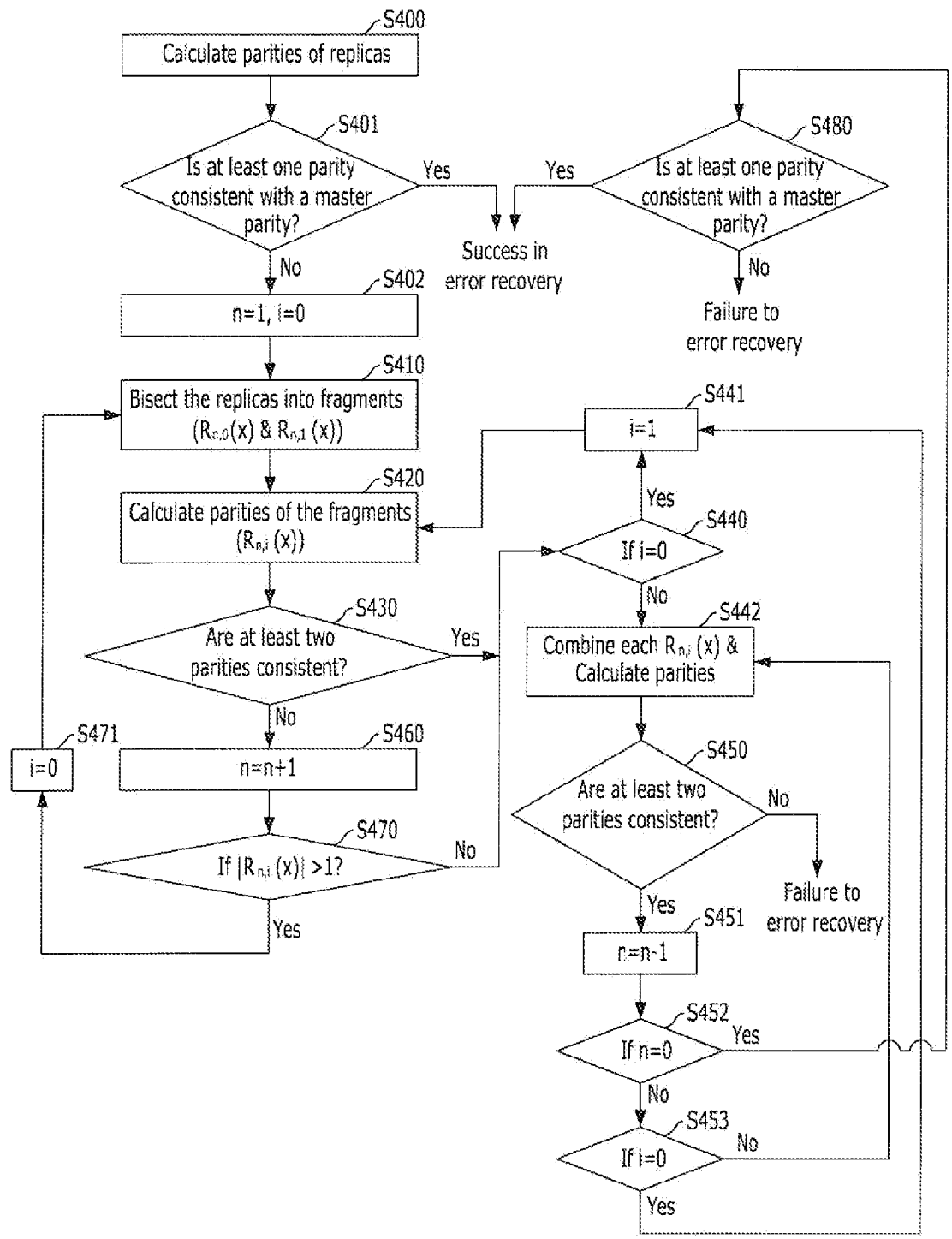
FIG. 4 illustrates a method for recovering errors from erroneous files in a storage system, in accordance with embodiments.

FIG. 4 illustrates a method for recovering errors from erroneous files in a storage system, in accordance with embodiments. For example, FIG. 4 particularly illustrates an error recovery process in case where the storage system has a master parity of each file. Referring to FIG. 4, each parities of corresponding replicas may be calculated S400. Although, for convenience and ease of understanding, the term "replica" may be used to describe any or all of corresponding files, the corresponding files may also include an original file as well as its replicas.

The calculated parities of the replicas may be compared with a master parity stored in a storage system S401. While a replica having a parity consistent with the master parity may be determined as a non-erroneous replica, a replica having a parity not matched with the master parity may be determined as an erroneous replica.

When at least one of the calculated parities of the replicas is consistent with the master parity (S401-YES), errors may be recovered by replacing erroneous replicas with the non-erroneous replica having the at least one parity consistent with the master parity. On the other hand, when no parities of the replicas are consistent with the master parity (S401-NO), all of the corresponding replicas may be determined to be erroneous replicas.

Then, an error recovery process according to embodiments may be performed with the erroneous replicas. First, a value of n and a value of i may be set to 1 and 0, respectively S402, wherein n may represent the number of times of bisecting of the corresponding replicas and i may represent the first fragments or the second fragments of bisected replicas. When i is 0, it may represent the first fragments of the bisected replicas. When i is 1, it may represent the second fragments of the bisected replicas.

Then, each replica may be bisected into the first and second fragments S410. The bisected replicas may be expressed as $R_{n,i}(x)$, wherein x may represent an, xth replica among the corresponding replicas. For example, $R_{1,0}(2)$ may represent the first fragment of the second replica stored in the storage system, which may be bisected one time.

Each parities of the fragments of the bisected replicas may be calculated S420 and the calculated parities may be compared each other S430. When at least two parities among the parities of the fragments are consistent each other (S430-YES), the corresponding fragments may be determined to be non-erroneous. Then, a determination may be made as to whether the value of i is zero S440. If i is 0, it may represent that the first fragments of the replicas are verified. In order to verify the second fragments of the replicas, the value of i may be set to 1 S441. Each parity of the second fragments may be calculated S420.

When at least two parities among the parities of the second fragments are consistent each other (S430-YES), the corresponding fragments having the matched parities may be determined as non-erroneous. Then, a determination may be made again as to whether the value of i is zero S440. If i is 1, it may represent that both the, first and second fragments of the replicas are verified. In other words, both the first and second fragments may be determined to be non-erroneous or the errors in the first and second fragments may be recovered. Then, the first and second fragments may be combined to form recovered replicas and the parities of the recovered replicas may be calculated S442.

When at least two parities among the parities of the recovered replicas are consistent each other (S450-YES), it may mean that there are no errors in all recovered replicas. Remaining erroneous replicas may be recovered by replacing with the non-erroneous replica. Then, the value of n may be decreased by 1 S451. When the value of n is not zero (S452-NO) and the value of i is zero (S453-YES), the value of i may be set to 1 S441.

Again, each parity of the fragments may be calculated S420. When at least two parities among the parities of the fragments are consistent each other (S430-YES), the corresponding fragments may be determined to be non-erroneous. When the value of n is not zero (S452-NO) and the value of i is 1 (S453-NO), it may represent that the second fragments of the replicas are verified. When the value of n is zero, it may mean that all errors in the replicas are recovered. Therefore, a determination may be made as to whether at least one of the parities of the replicas is consistent with the master parity S480.

When at least one parity is consistent with the master parity (S480-YES), the error recovery may be determined to be successful. On the other hand, when no parities of the replicas are consistent with the master parity, the error recovery may be determined to be failed. An error recovery may fail if the errors occur at the same location in all the respective replicas. However, a chance for an error recovery to fail may be very low since a possibility that errors occur at the same location in all replicas is very low.

When no parities of the replicas are consistent with each other (S430-NO), the value of n may be increased by 1 S460. Then, a determination may be made as to whether a size of a bisected replica $|R_{n,i}(x)|$ is larger than 1 bit S470. When the size of the bisected replica is larger than 1, $|R_{n,i}(x)|>1$, (S470-YES), the value of i may be set to zero S471 and the process may return to S410. When the size of the bisected replica is not larger than 1 (S470-NO), it may mean that the size of the bisected replica becomes 1 bit and the process may return to S440. Accordingly, errors may be recovered even when all of an original file and its replicas have errors, providing data consistency in a storage system.

Figure 5:
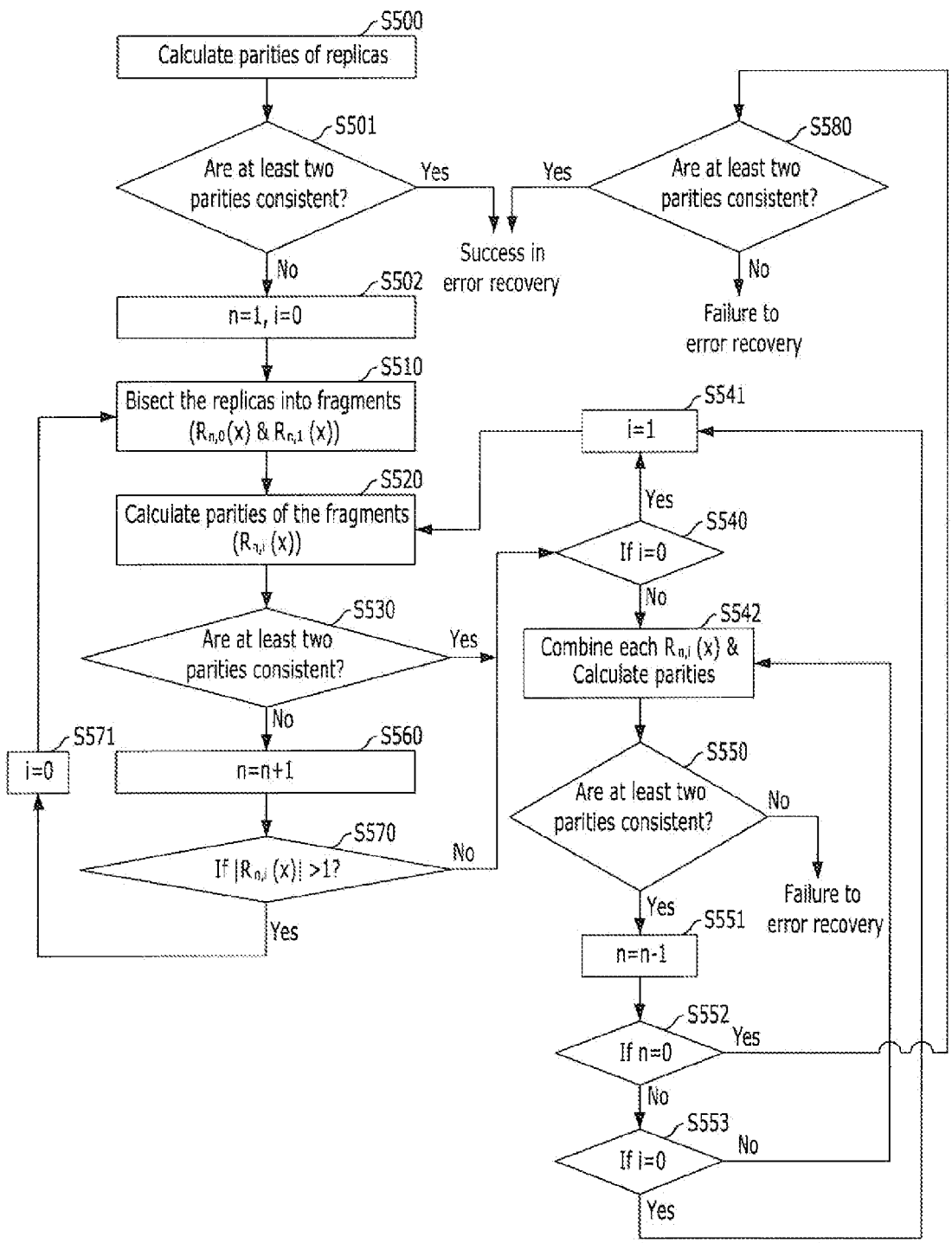
FIG. 5 illustrates a method for recovering errors from erroneous files in a storage system, in accordance with embodiments.

FIG. 5 illustrates a method for recovering errors from erroneous files in a storage system, in accordance with embodiments. For example, FIG. 5 particularly illustrates an error recovery process cases where the storage system does not have a master parity. Each parity of corresponding replicas may be calculated S500. Although, for convenience and ease of understanding, the term "replica" may be used to describe any or all of corresponding files, the corresponding files may also include an original file as well as its replicas.

The calculated parities of the replicas may be compared with each other S501. When at least two parities among the parities of the replicas are consistent with each other (S501-YES), replicas having the matched parities may be determined to be non-erroneous while remaining replicas having non-matched parities may be determined to be erroneous. Errors may be recovered by replacing the erroneous replica with the non-erroneous replica.

When at least two parities of the replicas are not consistent with each other (S501-NO), all of the corresponding replicas may be determined to be erroneous replicas. An error recovery process according to embodiments may then be performed with the erroneous replicas.

First, a value of n and a value of i may be set to 1 and 0, respectively S502, wherein n may represent the number of times of bisecting of the corresponding replicas and i may represent the first fragments or the second fragments of bisected replicas. If i is 0, it may represent the first fragments of the bisected replicas. If i is 1, it may represent the second fragments of the bisected replicas.

Second, each replica may be bisected into the first and second fragments S510. The bisected replicas may be expressed as $R_{n,i}(x)$, wherein x may represent an xth replica among the corresponding replicas. For example, $R_{1,0}(2)$ may represent the first fragment of the second replica stored in the storage system, which may be bisected one time.

Each parity of the fragments of the bisected replicas may be calculated S520 and the calculated parities may be compared to each other S530. When at least two parities among the parities of the fragments are consistent each other (S530-YES), the corresponding fragments may be determined to be non-erroneous. Then, a determination may be made as to whether the value of i is zero S540. If i is 0, it may represent that the first fragments of the replicas are verified. In order to verify the second fragments of the replicas, the value of i may be set to 1 S541. Each parity of the second fragments may be calculated S520.

When at least two parities among the parities of the second fragments are consistent each other (S530-YES), the corresponding fragments having the matched parities may be determined to be non-erroneous. Then, a determination may be made again as to whether the value of i is zero S540. If i is 1, it may represent that both the first and second fragments of the replicas are verified. In other words, both the first and second fragments may be determined to be non-erroneous, or the errors in the first and second fragments may be recovered.

The first and second fragments may then be combined to form recovered replicas and the parities of the recovered replicas may be calculated S542. When at least two parities among the parities of the recovered replicas are consistent with each other (S550-YES), it may mean that there are no errors in all recovered replicas. Remaining erroneous replicas may be recovered by replacing the non-erroneous replica. The value of n may then be decreased by 1 S551. When the value of n is not zero (S552-NO) and the value of i is zero (S553-YES), the value of i may be set to 1 S541.

Each parities of the fragments may be calculated S520. When at least two parities among the parities of the fragments are consistent with each other (S530-YES), the corresponding fragments may be determined as non-erroneous. When the value of n is not zero (S552-NO) and the value of i is 1 (S553-NO), it may represent that the second fragments of the replicas are verified. When the value of n is zero, it may mean that all errors in the replicas are recovered. Therefore, a determination may be made as to whether at least two parities among the parities of the replicas are consistent each other S580.

When the at least two parities are consistent each other (S580-YES), the error recovery may be determined to be successful. On the other hand, when no parities of the replicas are consistent each other, the error recovery may be determined to have failed.

An error recovery may fail if the errors occur at the same location in all the respective replicas. However, a chance for an error recovery to fail may be relatively low since a possibility that errors occur at the same location in all replicas is very low and/or practically unlikely.

Meanwhile, when no parities of the replicas are consistent with each other (S530-NO), the value of n may be increased by 1 S560. Then, a determination may be made as to whether a size of a bisected replica $|R_{n,i}(x)|$ is larger than 1 bit S570. When the size of the bisected replica is larger than 1, $|R_{n,i}(x)|>1$, (S570-YES), the value of i may be set to zero S571 and the process may return to S510. When the size of the bisected replica is not larger than 1 (S570-NO), it may mean that the size of the bisected replica becomes 1 bit and the process may return to S540. Accordingly, errors may be recovered even when all of an original file and its replicas have errors, providing data consistency in a storage system.

As described above, in accordance with embodiments, even in cases where a storage system has no master parity of each files, the storage system may recover errors from all erroneous files including an original file and its replicas by comparing each parities of the corresponding files to verify data consistency among the corresponding files. Therefore, the storage system may provide safe and reliable storage services even when a master parity may not be stored in the storage system.

The invention may also be embodied as computer readable codes on a computer readable recording medium. The computer readable recording medium may be any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A method for recovering errors from erroneous files in a storage system, the method comprising:
dividing each of at least three erroneous files stored in the storage system in half to form three sets of divided files;

comparing three corresponding portions from each of the three sets of divided files;
determining whether at least two portions among the three corresponding portions are identical, wherein identical portions are determined to be non-erroneous portions; and
replacing a non-matched portion that is not identical to the two identical portions with one of the non-erroneous portions,
wherein the method further comprises:
  (a) dividing each of the three corresponding portions in half when the at least two portions are not determined to be identical;
  (b) comparing three corresponding sub-portions with each other;
  (c) determining whether at least two sub-portions among the three corresponding sub-portions are identical, wherein identical sub-portions are determined to be non-erroneous sub-portions; and
  (d) replacing a non-matched sub-portion that is not identical to the two identical sub-portions with one of the non-erroneous sub-portions.

2. The method of claim 1, wherein the at least three erroneous files comprise at least one of an original file and its replicas.

3. The method of claim 1, wherein the comparing the three corresponding portions comprises computing parities of each of the three corresponding portions.

4. The method of claim 1, after the replacing the non-matched portion with the non-erroneous portion, the method further comprising:
  combining respective divided portions from each of the at least three erroneous files to form recovered files;
  comparing parities of the recovered files with a master parity stored in the storage system; and
  determining an error recovery to be successful when at least one parity among the parities of the recovered files is identical to the master parity.

5. The method of claim 1, after the replacing the non-matched portion with the non-erroneous portion, the method further comprising:
  combining respective divided portions from each of the at least three erroneous files to form recovered files;
  comparing parities of the recovered files with each other; and
  determining an error recovery to be successful when at least two parities among the parities of the recovered files are identical.

6. The method of claim 1, wherein prior to the dividing each of the at least three erroneous files, the method further comprises:
  comparing parities of corresponding files including an original file and its replicas with a master parity stored in the storage system; and
  determining all of the corresponding files to be erroneous when no parities of the corresponding files are identical to the master parity.

7. The method of claim 1, wherein prior to the dividing each of the at least three erroneous files, the method further comprises:
  comparing parities of corresponding files including an original file and its replicas with each other; and
  determining all of the corresponding files to be erroneous when no parities of the corresponding files are identical to each other.

8. The method of claim 1, wherein after the determining whether the at least two sub-portions are identical, the method further comprising:
  repeating steps (a), (b), and (c) until a size of a divided sub-portion becomes 1 bit, when the at least two sub-portions are not determined to be identical.

9. A method for recovering errors from erroneous files in a storage system, the method comprising:
  comparing corresponding portions from each of the erroneous files;
  determining whether at least two corresponding portions among the corresponding portions are identical, wherein identical portions are determined to be non-erroneous portions;
  replacing a non-matched portion that is not identical to the two identical portions with one of the non-erroneous portions
  repeatedly dividing each of the corresponding portions into sub-portions until at least two corresponding sub-portions are identical.

10. The method of claim 9, wherein the repeatedly dividing each of the corresponding portions into the sub-portions comprises repeatedly dividing each of the corresponding portions into the sub-portions until a size of a non-matched sub-portion becomes 1 bit.

11. The method of claim 10, wherein the repeatedly dividing each of the corresponding portions into the sub-portions comprises dividing each of the corresponding portions in half.

12. The method of claim 9, wherein the comparing the corresponding portions from each of the erroneous files comprises comparing at least three corresponding portions divided from each of the erroneous files.

13. The method of claim 9, wherein the comparing the corresponding portions comprises computing parities of the corresponding portions to verify data consistency among the corresponding portions.

14. An apparatus for recovering errors from erroneous files stored in a storage system, the system comprising:
  a comparison unit configured to compare corresponding portions from each of the erroneous files;
  a determination unit configured to determine whether at least two corresponding portions among the corresponding portions are identical, wherein identical portions are determined to be non-erroneous portions;
  an error recovery unit configured to replace a non-matched portion that is not identical to the two identical portions with one of the non-erroneous portions to recover errors in the non-matched portion; and
  a division unit configured to divide each of the corresponding portions into sub-portions and to repeatedly divide each of the corresponding portions in half until at least two corresponding sub-portions are identical.

15. The apparatus of claim 14, wherein the erroneous files comprise at least one of an original file and its replicas.

16. The apparatus of claim 14, wherein the comparison unit is further configured to compute parities of the corresponding portions to verify data consistency among the corresponding portions.

17. The apparatus of claim 14, wherein the division unit is further configured to repeatedly divide each of the corresponding portions in half until a size of a divided sub-portion becomes 1 bit, when the at least two corresponding sub-portions are not identical.

* * * * *